(12) United States Patent
Li et al.

(10) Patent No.: US 9,801,205 B2
(45) Date of Patent: Oct. 24, 2017

(54) DATA TRANSMISSION METHOD, APPARATUS AND SYSTEM

(71) Applicant: Huawei Technologies Co., Ltd., Shenzhen (CN)

(72) Inventors: Yunbo Li, Shenzhen (CN); Tianyu Wu, Shenzhen (CN); Yi Luo, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 212 days.

(21) Appl. No.: 14/818,016

(22) Filed: Aug. 4, 2015

(65) Prior Publication Data

US 2015/0341954 A1 Nov. 26, 2015

Related U.S. Application Data

(63) Continuation of application No. PCT/CN2013/083940, filed on Sep. 22, 2013.

(30) Foreign Application Priority Data

Feb. 6, 2013 (CN) .......................... 2013 1 0047171

(51) Int. Cl.
*H04W 72/12* (2009.01)
*H04W 28/00* (2009.01)
(Continued)

(52) U.S. Cl.
CPC ....... *H04W 72/1284* (2013.01); *H04L 5/0007* (2013.01); *H04W 28/20* (2013.01);
(Continued)

(58) Field of Classification Search
None
See application file for complete search history.

(56) References Cited

U.S. PATENT DOCUMENTS

2005/0226270 A1* 10/2005 Liu .................. H04W 74/0816
  370/469
2006/0072492 A1   4/2006 Trainin
(Continued)

FOREIGN PATENT DOCUMENTS

CN      102090024 A      6/2011
CN      102281595 A      12/2011
(Continued)

OTHER PUBLICATIONS

IEEE, "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications," IEEE Std 802.11, 2012, 2793 pages.
(Continued)

*Primary Examiner* — Candal Elpenord
(74) *Attorney, Agent, or Firm* — Brinks Gilson & Lione

(57) ABSTRACT

Embodiments of the present disclosure provide a data transmission method, apparatus and system. The method includes: receiving an RTS frame sent by a legacy STA on a channel including a primary channel, and sending an indicating frame to the legacy STA and a new station, for enabling the legacy STA to send data on the channel including the primary channel according to the indicating frame, and enabling the new station to send data on a secondary channel not occupied by the legacy STA according to the indicating frame. By adopting the data transmission method, apparatus and system provided by the embodiments of the present disclosure, uplink OFDMA data transmission under a compatible mode is achieved, and the problem of bandwidth waste caused by data transmission of the legacy STA is solved.

6 Claims, 6 Drawing Sheets

(51) Int. Cl.
*H04L 5/00* (2006.01)
*H04W 28/20* (2009.01)
*H04W 74/08* (2009.01)
*H04W 74/00* (2009.01)
*H04W 84/12* (2009.01)

(52) U.S. Cl.
CPC ......... *H04W 74/006* (2013.01); *H04W 74/08* (2013.01); *H04W 84/12* (2013.01)

(56) References Cited

U.S. PATENT DOCUMENTS

| | | | |
|---|---|---|---|
| 2007/0153830 A1* | 7/2007 | Xhafa | H04W 28/06 370/470 |
| 2011/0110351 A1 | 5/2011 | Seok | |
| 2012/0052900 A1 | 3/2012 | Liu et al. | |
| 2012/0243485 A1 | 9/2012 | Merlin et al. | |
| 2013/0070697 A1 | 3/2013 | Christin et al. | |
| 2015/0139137 A1 | 5/2015 | Seok | |

FOREIGN PATENT DOCUMENTS

| | | |
|---|---|---|
| KR | 10-2010-0011141 | 2/2010 |
| WO | WO 2008/155931 A1 | 12/2008 |
| WO | WO 2011/110778 A1 | 9/2011 |
| WO | WO 2012/030677 A2 | 3/2012 |
| WO | WO 2012/064502 A1 | 5/2012 |
| WO | WO 2012/150844 A2 | 11/2012 |

OTHER PUBLICATIONS

IEEE, "Draft Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 4: Enhancements for Very High Throughput for Operation in Bands below 6 GHz," IEEE P802.11ac/DC5.0, 2013, 440 pages.

* cited by examiner

DATA TRANSMISSION METHOD, APPARATUS AND SYSTEM

CROSS-REFERENCE TO RELATED APPLICATIONS

This application is a continuation of International Application No. PCT/CN2013/083940, filed on Sep. 22, 2013, which claims priority to Chinese Patent Application No. 201310047171.5, filed on Feb. 6, 2013, both of which are hereby incorporated by reference in their entireties.

TECHNICAL FIELD

Embodiments of the present disclosure relate to communication technologies, and particularly to data transmission methods, apparatus and systems.

BACKGROUND

In a standard evolution process of a wireless local access network (Wireless local access network, referred to as WLAN), an important characteristic is backward compatibility, that is, a new access point (Access Point, hereinafter referred to as AP) and a station (STA) may be transferred in an old format, the old STA may normally communicate under the new AP. In the WLAN standard evolution process of an orthogonal frequency division multiplexing (orthogonal frequency division multiplexing, hereinafter referred to as OFDM) system, the bandwidth gradually becomes large. A bandwidth of 20 MHz is adopted in the initial IEEE 802.11a, the bandwidth is extended to 40 MHz in IEEE 802.11n, the bandwidth is further extended to 80 MHz and 160 MHz (80+80 MHz) in IEEE 802.11ac, and a larger communication bandwidth may be adopted in the future WLAN standard. The network is upgraded to apply a new standard, and the original device is generally compatible in the upgrading process. When the network is upgraded, for example, upgraded from an IEEE 802.11n network to an IEEE 802.11ac network, two new and old stations will exist, the old station is a legacy STA, and is a station before the network is upgraded and supports the standard before upgrade, for example, standard IEEE 802.11n, the new station is a newly added station, is a station deployed after the network is upgraded and supports two standards before and after upgrade, for example, both supporting IEEE 802.11n and IEEE 802.11ac.

However, no matter how large the total communication bandwidth is extended, a primary channel and a secondary channel beyond the primary channel exist. In a communication process, both the new station and the old station must select a channel including the primary channel to transmit data. Since the bandwidth capable of being supported by the legacy STA is relatively small, while the bandwidth capable of being supported by the new station is relatively large, when the old station sends data to the AP, the bandwidth resources will be wasted seriously.

SUMMARY

Embodiments of the present disclosure provide a data transmission method, apparatus and system, which are used for achieving uplink OFDMA data transmission under a compatible mode and solving the problem of bandwidth waste caused by data transmission of the legacy STA.

In a first aspect, the embodiments of the present disclosure provide a data transmission method, including:

receiving a request to send (RTS) frame sent by a legacy STA on a channel including a primary channel; and sending an indicating frame to the legacy STA and a new station, for enabling the legacy STA to send data on the channel including the primary channel according to the indicating frame, and enabling the new station to send data on a secondary channel not occupied by the legacy STA according to the indicating frame.

In a first possible implementation manner of the first aspect, the sending an indicating frame to the legacy STA and a new station, for enabling the legacy STA to send data on the channel including the primary channel according to the indicating frame, and enabling the new station to send data on a secondary channel not occupied by the legacy STA according to the indicating frame, includes:

sending a clear to send (CTS) frame to the legacy STA on the channel including the primary channel, for enabling the legacy STA to send the data on the channel including the primary channel according to the CTS frame; and sending a scheduling frame to the new station on the secondary channel not occupied by the legacy STA, for enabling the new station to send the data on the secondary channel not occupied by the legacy STA according to the scheduling frame.

In combination with the first possible implementation manner of the first aspect, in a second possible implementation manner of the first aspect, the sending a scheduling frame to the new station on the secondary channel not occupied by the legacy STA, for enabling the new station to send the data on the secondary channel not occupied by the legacy STA according to the scheduling frame, includes:

sending the scheduling frame including the identifier of the new station to the new station on the secondary channel not occupied by the legacy STA, for enabling the new station to send the data on the secondary channel not occupied by the legacy STA after determining that the new station has being scheduled according to the identifier; or, sending the scheduling frame including the identifiers of a group of schedulable new stations to the new stations, for enabling the group of new stations to send the data on the secondary channel not occupied by the legacy STA according to a data sending demand.

In combination with the first aspect, in a third possible implementation manner of the first aspect, the sending an indicating frame to the legacy STA and a new station, for enabling the legacy STA to send data on the channel including the primary channel according to the indicating frame, and enabling the new station to send data on a secondary channel not occupied by the legacy STA according to the indicating frame, includes:

sending a CTS frame including new station scheduling indication information to the legacy STA and the new station on the channel including the primary channel, for enabling the legacy STA to send the data on the channel including the primary channel according to the CTS frame, and enabling the new station to send the data on the secondary channel not occupied by the legacy STA according to the CTS frame.

In combination with the third possible implementation manner of the first aspect, in a fourth possible implementation manner of the first aspect, the new station scheduling indication information includes:

the identifier of the new station to be scheduled; or, the identifiers of a group of schedulable new stations; or, the indication state information of an indication identifying site.

In combination with the method in any one of the first aspect to the fourth possible implementation manner of the first aspect, in a fifth possible implementation manner of the first aspect, after the legacy STA and the new station send data, the method further includes:

sending a first acknowledgement frame to the legacy STA on the channel including the primary channel, wherein the first acknowledgement frame includes information used for indicating whether the data of the legacy STA are correctly received or not; and sending a second acknowledgement frame to the new station on the secondary channel not occupied by the legacy STA, wherein the second acknowledgement frame includes information used for indicating whether the data of the new station are correctly received or not.

In combination with the fifth possible implementation manner of the first aspect, in a sixth possible implementation manner of the first aspect, the indicating frame and/or the acknowledgement frame is transmitted in an OFDMA manner.

In combination with the method in any one of the first aspect to the fourth possible implementation manner of the first aspect, in a seventh possible implementation manner of the first aspect, the indicating frame further includes a bandwidth occupied by the legacy STA and a reserved duration, and/or a bandwidth capable of being used by the new station and a transmission duration.

In a second aspect, the embodiments of the present disclosure provide a data transmission method, including:
  receiving an indicating frame sent by an access point; and
  sending data on a secondary channel not occupied by a legacy STA according to the indicating frame.

In a first possible implementation manner of the second aspect, the receiving an indicating frame sent by an access point, and sending data on a secondary channel not occupied by a legacy STA according to the indicating frame, includes:
  receiving a scheduling frame sent by the access point on the secondary channel not occupied by the legacy STA; and
  sending the data on the secondary channel not occupied by the legacy STA according to the scheduling frame.

In combination with the first possible implementation manner of the second aspect, in a second possible implementation manner of the second aspect, the receiving a scheduling frame sent by the access point on the secondary channel not occupied by the legacy STA, and sending the data on the secondary channel not occupied by the legacy STA according to the scheduling frame, includes:
  receiving the scheduling frame including the identifier of the new station and sent by the access point on the secondary channel not occupied by the legacy STA, and determining to send the data on the secondary channel not occupied by the legacy STA after determining that the new station has being scheduled according to the identifier; or
  receiving the scheduling frame including the identifiers of a group of schedulable new stations sent by the access point, and sending the data on the secondary channel not occupied by the legacy STA according to a data sending demand.

In combination with the second aspect, in a third possible implementation manner of the second aspect, the receiving an indicating frame sent by an access point, and sending data on a secondary channel not occupied by a legacy STA according to the indicating frame, includes:
  receiving a CTS frame including new station scheduling indication information sent by the access point on a channel including the primary channel; and
  sending the data on the secondary channel not occupied by the legacy STA according to the CTS frame.

In combination with the third possible implementation manner of the second aspect, in a fourth possible implementation manner of the second aspect, the new station scheduling indication information includes:
  the identifier of the new station to be scheduled; or,
  the identifiers of a group of schedulable new stations; or,
  the indication state information of an indication identifying site.

In combination with the method in any one of the second aspect to the fourth possible implementation manner of the second aspect, in a fifth possible implementation manner of the second aspect, after the sending data on a secondary channel not occupied by a legacy STA according to the indicating frame, the method further includes:
  receiving a second acknowledgement frame sent by the access point on the secondary channel not occupied by the legacy STA, wherein the indicating frame and/or the second acknowledgement frame are/is transmitted in an OFDMA manner;
  the sending data on a secondary channel not occupied by a legacy STA according to the indicating frame includes:
    sending the data on the secondary channel not occupied by the legacy STA according to the indicating frame in an OFDMA manner.

In combination with the method in any one of the second aspect to the fourth possible implementation manner of the second aspect, in a sixth possible implementation manner of the second aspect, the indicating frame further includes a bandwidth occupied by the legacy STA and a reserved duration, and/or a bandwidth capable of being used by the new station and a transmission duration;
  before the sending data on a secondary channel not occupied by a legacy STA according to the indicating frame, the method further includes:
    analyzing the indicating frame to obtain the bandwidth occupied by the legacy STA and the reserved duration, and/or the bandwidth capable of being used by the new station and the transmission duration;
  the sending data on a secondary channel not occupied by a legacy STA according to the indicating frame includes:
    sending the data on the secondary channel not occupied by the legacy STA according to the obtained bandwidth occupied by the legacy STA and the reserved duration, and/or the bandwidth capable of being used by the new station and the transmission duration.

In a third aspect, the present disclosure provides a data transmission method, including:
  monitoring a data frame sent by a legacy STA;
  analyzing the frame header of the data frame sent by the legacy STA to obtain a transmission bandwidth and a transmission duration of the legacy STA; and
  sending data on a secondary channel not occupied by the legacy STA according to the obtained transmission bandwidth and the transmission duration of the legacy STA, wherein the end moment of sending data may not exceed the transmission end moment of the legacy STA.

In a fourth aspect, the present disclosure provides a data transmission apparatus, including:
  a receiving module, configured to receive a request to send (RTS) frame sent by a legacy STA on a channel including a primary channel; and
  a sending module, configured to send an indicating frame to the legacy STA and a new station, for enabling the legacy STA to send data on the channel including the primary channel according to the indicating frame, and enabling the new station to send data on a secondary channel not occupied by the legacy STA according to the indicating frame.

In a first possible implementation manner of the fourth aspect, the sending module includes:

a first sending unit, configured to send a clear to send (CTS) frame to the legacy STA on the channel including the primary channel, for enabling the legacy STA to send the data on the channel including the primary channel according to the CTS frame; and a second sending unit, configured to send a scheduling frame to the new station on the secondary channel not occupied by the legacy STA, for enabling the new station to send the data on the secondary channel not occupied by the legacy STA according to the scheduling frame.

In combination with the first possible implementation manner of the fourth aspect, in a second possible implementation manner of the fourth aspect, the second sending unit is specifically configured to:

send the scheduling frame including the identifier of the new station to the new station on the secondary channel not occupied by the legacy STA, for enabling the new station to send the data on the secondary channel not occupied by the legacy STA after determining that the new station has being scheduled according to the identifier; or, send the scheduling frame including the identifiers of a group of schedulable new stations to the new stations, for enabling the group of new stations to send the data on the secondary channel not occupied by the legacy STA according to a data sending demand.

In combination with the first aspect, in a third possible implementation manner of the fourth aspect, the sending module is specifically configured to:

send a CTS frame including new station scheduling indication information to the legacy STA and the new station on the channel including the primary channel, for enabling the legacy STA to send the data on the channel including the primary channel according to the CTS frame, and enabling the new station to send the data on the secondary channel not occupied by the legacy STA according to the CTS frame.

In combination with the fourth possible implementation manner of the fourth aspect, in a fourth possible implementation manner of the fourth aspect, the new station scheduling indication information includes:

the identifier of the new station to be scheduled; or, the identifiers of a group of schedulable new stations; or, the indication state information of an indication identifying site.

In combination with the apparatus in any one of the fourth aspect to the fourth possible implementation manner of the fourth aspect, in a fifth possible implementation manner of the fourth aspect, the sending module is further configured to:

send a first acknowledgement frame to the legacy STA on the channel including the primary channel, wherein the first acknowledgement frame includes information used for indicating whether the data of the legacy STA are correctly received or not; and send a second acknowledgement frame to the new station on the secondary channel not occupied by the legacy STA, wherein the second acknowledgement frame includes information used for indicating whether the data of the new station are correctly received or not;

In combination with the fifth possible implementation manner of the fourth aspect, in a sixth possible implementation manner of the fourth aspect, the indicating frame and/or the acknowledgement frame is transmitted in an OFDMA manner.

In combination with the apparatus in any one of the fourth aspect to the fourth possible implementation manner of the fourth aspect, in a seventh possible implementation manner of the fourth aspect, the indicating frame further includes a bandwidth occupied by the legacy STA and a reserved duration, and/or a bandwidth capable of being used by the new station and a transmission duration.

In a fifth aspect, the embodiments of the present disclosure provide a data transmission apparatus, including:

a receiving module, configured to receive an indicating frame sent by an access point; and a sending module, configured to send data on a secondary channel not occupied by a legacy STA according to the indicating frame.

In a first possible implementation manner of the fifth aspect, the receiving module is specifically configured to receive a scheduling frame sent by the access point on the secondary channel not occupied by the legacy STA;

the sending module is specifically configured to send the data on the secondary channel not occupied by the legacy STA according to the scheduling frame.

In combination with the first possible implementation manner of the fifth aspect, in a second possible implementation manner of the fifth aspect, the receiving module is specifically configured to receive the scheduling frame including the identifier of the new station and sent by the access point on the secondary channel not occupied by the legacy STA;

the sending module is specifically configured to send the data on the secondary channel not occupied by the legacy STA after determining that the new station has being scheduled according to the identifier; or, the receiving module is specifically configured to receive the scheduling frame including the identifiers of a group of schedulable new stations sent by the access point; and the sending module is specifically configured to send the data on the secondary channel not occupied by the legacy STA according to a data sending demand.

In combination with the fifth aspect, in a third possible implementation manner of the fifth aspect, the receiving module is specifically configured to receive a CTS frame including new station scheduling indication information sent by the access point on a channel including the primary channel;

the sending module is specifically configured to send the data on the secondary channel not occupied by the legacy STA according to the CTS frame.

In combination with the third possible implementation manner of the fifth aspect, in a fourth possible implementation manner of the fifth aspect, the new station scheduling indication information includes:

the identifier of the new station to be scheduled; or, the identifiers of a group of schedulable new stations; or, the indication state information of an indication identifying site.

In combination with the apparatus in any one of the fifth aspect to the fourth possible implementation manner of the fifth aspect, in a fifth possible implementation manner of the fifth aspect, the receiving module is further configured to receive a second acknowledgement frame sent by the access point on the secondary channel not occupied by the legacy STA after sending the data on the secondary channel not occupied by the legacy STA according to the indicating frame, wherein the indicating frame and/or the second acknowledgement frame are/is transmitted in an OFDMA manner;

the sending module is specifically configured to send the data on the secondary channel not occupied by the legacy STA according to the indicating frame in an OFDMA manner.

In combination with the apparatus in any one of the fifth aspect to the fourth possible implementation manner of the fifth aspect, in a sixth possible implementation manner of the fifth aspect, the indicating frame further includes a bandwidth occupied by the legacy STA and a reserved duration, and/or a bandwidth capable of being used by the new station and a transmission duration;

the apparatus further includes:

an analyzing module, configured to analyze the indicating frame to obtain the bandwidth occupied by the legacy STA and the reserved duration, and/or the bandwidth capable of being used by the new station and the transmission duration, before sending the data on the secondary channel not occupied by the legacy STA according to the indicating frame;

the sending module is specifically configured to send the data on the secondary channel not occupied by the legacy STA according to the obtained bandwidth occupied by the legacy STA and the reserved duration, and/or the bandwidth capable of being used by the new station and the transmission duration.

In a sixth aspect, the embodiments of the present disclosure provide a data transmission apparatus, including:

a monitoring module, configured to monitor a data frame sent by a legacy STA;

an analyzing module, configured to analyze the frame header of the data frame sent by the legacy STA to obtain a transmission bandwidth and a transmission duration of the legacy STA; and a sending module, configured to send data on a secondary channel not occupied by the legacy STA according to the obtained transmission bandwidth and the transmission duration of the legacy STA, wherein the end moment of sending data may not exceed the transmission end moment of the legacy STA.

In a seventh aspect, the embodiments of the present disclosure provide a data transmission system, including the data transmission apparatus in any one of the fourth aspect to the seventh possible implementation manner of the fourth aspect and the data transmission apparatus in any one of the fifth aspect to the sixth aspect.

According to the data transmission method, apparatus and system provided by the embodiments of the present disclosure, the RTS frame sent by the legacy STA on the channel including the primary channel is received through the AP, and the indicating frame is sent to the legacy STA and the new station, for enabling the legacy STA to send the data on the channel including the primary channel according to the indicating frame, and enabling the new station to send the data on the secondary channel not occupied by the legacy STA according to the indicating frame, such that uplink OFDMA data transmission under a compatible mode is achieved, and the problem of bandwidth waste caused by data transmission of the legacy STA is solved.

BRIEF DESCRIPTION OF DRAWINGS

To illustrate technical solutions in the embodiments of the present disclosure or in the prior art more clearly, a brief introduction on the accompanying drawings which are needed in the description of the embodiments or the prior art is given below. Apparently, the accompanying drawings in the description below are merely some of the embodiments of the present disclosure, based on which other drawings may be obtained by those of ordinary skill in the art without any creative effort.

DESCRIPTION OF EMBODIMENTS

In order that the purposes, technical solutions and advantages of the embodiments in the present disclosure are clearer, a clear and complete description of the technical solutions in the embodiments of the present disclosure will be given below in combination with the accompanying drawings. Apparently, the embodiments described below are merely a part, but not all, of the embodiments of the present disclosure. All of the other embodiments, obtained by those of ordinary skill in the art based on the embodiments of the present disclosure without any creative effort, fall into the protection scope of the present disclosure.

Figure 1:
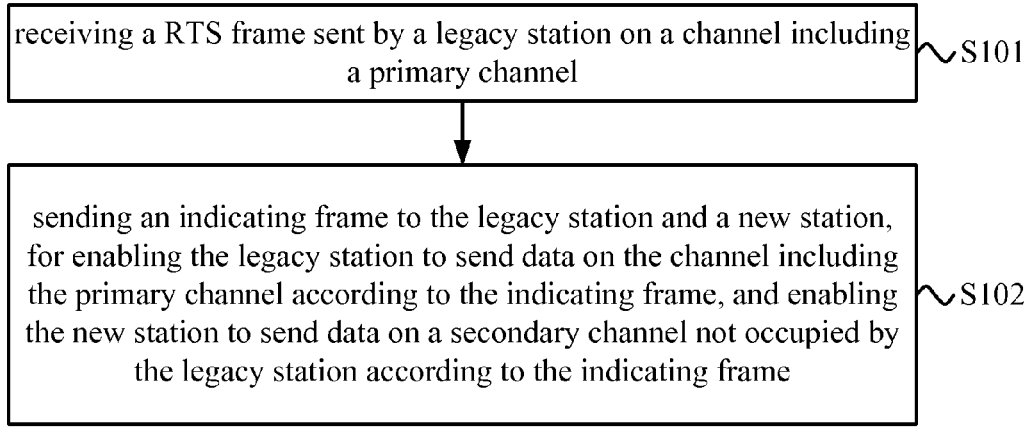
FIG. 1 is a flowchart of embodiment 1 of a data transmission method in the present disclosure.

FIG. 1 is a flowchart of embodiment 1 of a data transmission method in the present disclosure. The method in the embodiment is applicable to uplink multi-station OFDMA data transmission under a compatible mode, the embodiment is illustrated by taking it as an example that an access point is used as an executive body, and as shown in FIG. 1, the method in the embodiment may include:

S101. an RTS frame sent by a legacy STA on a channel including a primary channel is received.

The access point receives the request to send (Request To Send, hereinafter referred as RTS) frame sent by the legacy STA on the channel including the primary channel, in general, the legacy STA sends the RTS frame on the channel including the primary channel in a competition manner, herein it should be noted that, the RTS frame and the clear to send (Clear to send, hereinafter referred as CTS) frame mentioned below relate to a channel reservation mechanism in a wireless local area network (WLAN), and the mechanism may be initiated by the AP or the station. During reservation, an RTS frame is firstly sent, a network allocation vector (Network allocation vector, hereinafter referred as NAV) is set in the duration (Duration) field of the RTS frame to reserve the channel, and after receiving the RTS frame, a non-target user is not allowed to send any data within the NAV time even if the channel is idle. The period of time beginning from sending the RTS frame to ending to set the NAV is called a transmission opportunity (Transmission opportunity, referred to as TXOP), after receiving the RTS frame, an access target user will respond to the CTS frame, the NAV in the Duration field of the CTS frame will be set according to the NAV in the RTS frame, and the NAV of the CTS will be set to the end moment of TXOP. The non-target user receiving the CTS is not allowed to send any data within the TXOP time even if the channel is idle.

S102. an indicating frame is sent to the legacy STA and a new station, for enabling the legacy STA to send data on the channel including the primary channel according to the indicating frame, and enabling the new station to send data on a secondary channel not occupied by the legacy STA according to the indicating frame.

The access point sends the indicating frame to the legacy STA and the new station, for enabling the legacy STA to send the data on the channel including the primary channel according to the indicating frame, and enabling the new station to send the data on the secondary channel not occupied by the legacy STA according to the indicating frame, and there are two implementation manners:

as one implementation manner, the access point sends a CTS frame to the legacy STA on the channel including the primary channel, for enabling the legacy STA to send the data on the channel including the primary channel according to the CTS frame;

the access point sends a scheduling frame to the new station on the secondary channel not occupied by the legacy STA, for enabling the new station to send the data on the secondary channel not occupied by the legacy STA according to the scheduling frame.

The access point sends the scheduling frame to the new station on the secondary channel not occupied by the legacy STA in two possible implementation manners, one is that the access point sends the scheduling frame including the identifier of the new station to the new station on the secondary channel not occupied by the legacy STA, for enabling the new station to send the data on the secondary channel not occupied by the legacy STA after determining that the new station has being scheduled according to the identifier, and this condition may be applied to the situation that, for example, the AP determines that some stations have data to be sent according to the feedback information or service rule of the station; the other is that the access point sends the scheduling frame including the identifiers of a group of schedulable new stations to the new stations, for enabling the group of new stations to send the data on the secondary channel not occupied by the legacy STA according to a data sending demand, and this condition may be applied to the situation that, for example, the AP groups or broadcasts to all the stations in the case of having no exact sending information of the stations.

As another implementation manner, the access point sends a CTS frame including new station scheduling indication information to the legacy STA and the new station on the channel including the primary channel, for enabling the legacy STA to send the data on the channel including the primary channel according to the CTS frame, and enabling the new station to send the data on the secondary channel not occupied by the legacy STA according to the CTS frame. Under this implementation manner, compared with the former implementation manner, the new station only needs to monitor the data sent by the primary channel, thereby being more conducive to saving power and quite simple to achieve.

Figure 2:
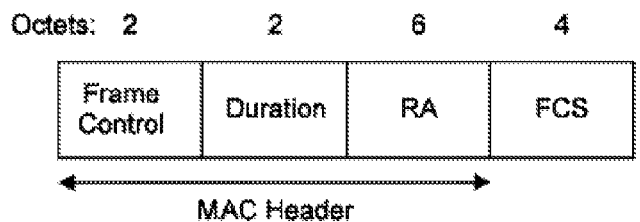
FIG. 2 is a schematic diagram of an MAC structure of a CTS frame in embodiment 1 of a data transmission method in the present disclosure.
Figure 3:
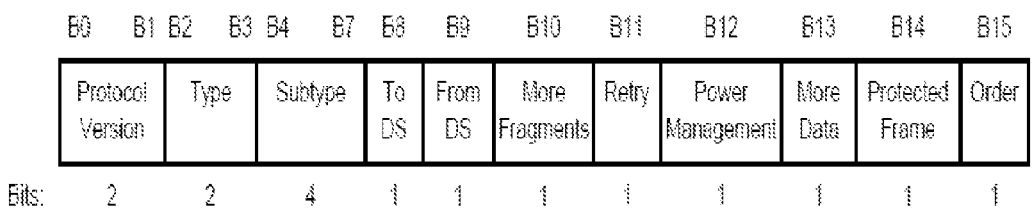
FIG. 3 is a schematic diagram of a structure of a frame control field in an MAC structure of a CTS frame in embodiment 1 of a data transmission method in the present disclosure.

Under this implementation manner, after the legacy STA successfully sends the RTS frame on the channel including the primary channel by competition, when replying the CTS frame to the legacy STA, the AP schedules the new station by using a reserved bit or a reusable bit in the CTS frame, and FIG. 2 is a schematic diagram of an MAC structure of a CTS frame in embodiment 1 of a data transmission method in the present disclosure, as shown in FIG. 2: a frame control (Frame Control) field, a duration (Duration) field, a receiver address (Receiver Address, referred to as RA) field, and a frame check sequence (Frame Check Sequence, referred to as FCS) field. FIG. 3 is a schematic diagram of a structure of a frame control field in an MAC structure of a CTS frame in embodiment 1 of a data transmission method in the present disclosure, as shown in FIG. 3: a protocol version (Protocol Version) field, a type (Type) field, a subtype (Subtype) field, a to distribution system (To Distribution System, referred to as To DS) field, a from distribution system (From Distribution System, referred to as From DS) field, a more fragments (More Fragments) field, a retry (Retry) field, a power management (Power Management) field, a more data (More Data) field, a protected frame (Protected Frame) field and an order (Order) field. As shown in FIG. 2 and FIG. 3, all or a part of the bits in B8 to B15 in the frame control field in the CTS frame may be multiplexed and may be used for indicating the scheduling to the new station.

Figure 4:
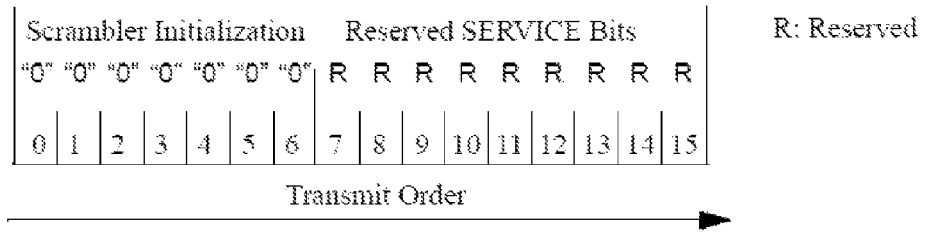
FIG. 4 is a schematic diagram of a structure of a service field in an MAC structure of a CTS frame in embodiment 1 of a data transmission method in the present disclosure.

In addition, a service field (Service field) exists in front of the MAC frames of all the frames. FIG. 4 is a schematic diagram of a structure of a service field in an MAC structure of a CTS frame in embodiment 1 of a data transmission method in the present disclosure, as shown in FIG. 4, the service field includes 16 bits in total, wherein the former 7 bits are scrambler initialization (Scrambler Initialization) bits and the latter 9 bits are reserved (Reserved) bits. In the service field, B7 to B15 belong to the reserved bits, and all or a part of the reserved bits may be used for indicating the scheduling to the new station. In addition, the reserved bits or the reusable bits in the preamble (Preamble) of a physical layer may also be used for indicating the scheduling of the new station, and information bits carried in the existing CTS frame in such manners as scrambling and the like may also be used for indicating the scheduling to the new station.

The new station scheduling indication information includes: the identifier of the new station to be scheduled; or, the identifiers of a group of schedulable new stations; or, the indication state information of an indication identifying site.

Since the number of the reserved bits and the reusable bits is limited, the identifiers and resource information of the stations may not be sufficiently expressed. Common station identification manner includes MAC address (48 bits) or association identifier (16 bits). In the case of insufficient available bits, the problem is solved by redefining scheduling identifiers or groups associated with the stations. For example, in the case of 6 available bits, at most 64 stations may be allocated with the scheduling identifiers, and only the stations allocated with the scheduling identifiers may participate in OFDMA scheduling. A part of station identifiers may also be used for scheduling, for example, the latter 6 bits of the MAC address or the association identifier are used for scheduling. In this manner, when the tail numbers of the station identifiers of multiple stations are the same and all of the multiple stations have data to be sent, collision is generated possibly. In an implementation process, an evasion mechanism may be further introduced to reduce the collision probability in the case of a quite high collision probability. When implementing the evasion mechanism on the secondary channel not occupied by the legacy STA, if a radio-frequency filter on an old channel is not steep enough to cause larger energy leakage of a neighboring band, frequency-domain detection needs to be performed on the secondary channel to determine whether the secondary channel is idle. Namely, a receiving channel is firstly converted into frequency domain, and then the signal strength on frequency points corresponding to carriers on the secondary channel is detected. When the signal strength is larger than a certain threshold, it indicates that the secondary channel is busy, otherwise, the secondary channel is idle.

When the new station scheduling indication information includes the indication state information of the indication identifying site, the indication state information is used for indicating the new station to send the data on the secondary channel not occupied by the legacy STA according to the CTS frame or not, under the condition that the legacy STA sends the data on the channel including the primary channel according to the CTS frame. For example, when the indication identifying site is 0, the new station sends no data on the secondary channel not occupied by the legacy STA according to the CTS frame, under the condition that the legacy STA sends the data on the channel including the primary channel according to the CTS frame; when the indication identifying site is 1, the new station sends the data on the secondary channel not occupied by the legacy STA according to the CTS frame, under the condition that the legacy STA sends the data on the channel including the primary channel according to the CTS frame, and at this time the new station may compete to send the data on the same channel. Under the above-mentioned condition, the indicating frame further includes a bandwidth occupied by the legacy STA and a reserved duration, and/or a bandwidth capable of being used by the new station and a transmission duration.

In the above-mentioned embodiment, optionally, after the legacy STA and the new station send data, after receiving the data of the new station and the legacy STA, the AP needs to acknowledge and reply to the legacy STA and the new station, and the method further includes: sending a first acknowledgement frame to the legacy STA on the channel including the primary channel, wherein the first acknowledgement frame includes information used for indicating whether the data of the legacy STA are correctly received or not, sending a second acknowledgement frame to the new station on the secondary channel not occupied by the legacy STA, wherein the second acknowledgement frame includes information used for indicating whether the data of the new station are correctly received or not. Wherein, the indicating frame and/or the acknowledgement frame are/is transmitted in an OFDMA manner. The form of the acknowledgment frame is determined by the data sending manner, and may include such different acknowledgment frame formats as acknowledgment (Acknowledgement, referred to as ACK), block acknowledgment (Block Acknowledgement, referred to as BA), and the like. The acknowledgement frame may be transmitted in a downlink OFDMA manner, that is, the acknowledgement frame is sent to the legacy STA on the channel including the primary channel, and the acknowledgement frame is sent to the new station on the secondary channel not occupied by the legacy STA. Other multi-station acknowledgement manners may also be applicable to the present embodiment. For example, the acknowledgement frame is respectively sent to the legacy STA and the new station in a time division manner; when replying to the acknowledgement frame of the legacy STA, whether the data of the new station are correctly transmitted are indicated via a reserved bit in the acknowledgement frame of the legacy STA.

According to the data transmission method provided by the embodiment, the AP receives the RTS frame sent by the legacy STA on the channel including the primary channel, and sends the indicating frame to the legacy STA and the new station, for enabling the legacy STA to send the data on the channel including the primary channel according to the indicating frame, and enabling the new station to send the data on the secondary channel not occupied by the legacy STA according to the indicating frame, such that uplink OFDMA data transmission under a compatible mode is achieved, and the problem of bandwidth waste caused by data transmission of the legacy STA is solved.

Figure 5:
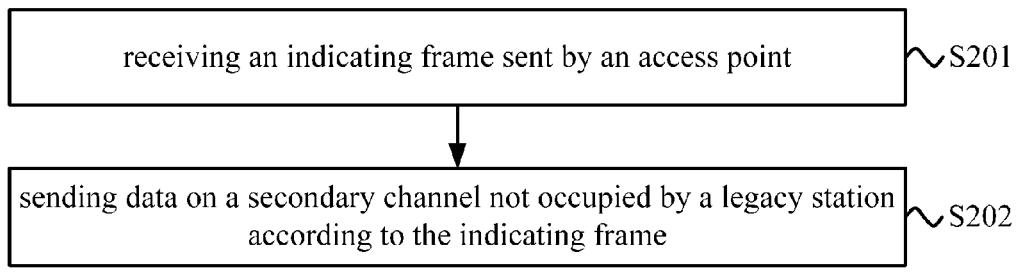
FIG. 5 is a flowchart of embodiment 2 of a data transmission method in the present disclosure.

FIG. 5 is a flowchart of embodiment 2 of a data transmission method in the present disclosure. The method in the embodiment is applicable to uplink multi-station OFDMA data transmission under a compatible mode, the embodiment is illustrated by taking it as an example that a new station is used as an executive body, and as shown in FIG. 5, the method in the embodiment may include:

S201. an indicating frame sent by an access point is received.

S202. data is sent on a secondary channel not occupied by a legacy STA according to the indicating frame.

After receiving the indicating frame sent by the access point, the new station sends the data on the secondary channel not occupied by the legacy STA according to the indicating frame in two implementation manners:

as one implementation manner, the new station receives a scheduling frame sent by the access point on the secondary channel not occupied by the legacy STA, and sends the data on the secondary channel not occupied by the legacy STA according to the scheduling frame.

The new station receives the scheduling frame sent by the access point on the secondary channel not occupied by the legacy STA, and sends the data on the secondary channel not occupied by the legacy STA according to the scheduling frame in two possible implementation manners, one is that the new station receives the scheduling frame including the identifier of the new station and sent by the access point on the secondary channel not occupied by the legacy STA, and determines to send the data on the secondary channel not occupied by the legacy STA after determining that the new station has being scheduled according to the identifier, and this condition may be applied to a situation that, for example, the AP determines that some stations have data to be sent according to the feedback information or service rule of the station; the other is that the new station receives the scheduling frame including the identifiers of a group of schedulable new stations sent by the access point, and sends the data on the secondary channel not occupied by the legacy STA according to a data sending demand, and this condition may be applied to the situation that, for example, the AP groups or broadcasts to all the stations in the case of having no exact sending information of the stations.

As another implementation manner, the new station receives a CTS frame including new station scheduling indication information sent by the access point on a channel including the primary channel. Under this implementation manner, compared with the former implementation manner, the new station only needs to monitor the data sent by the primary channel, thereby being more conducive to saving power and quite simple to achieve.

Under this implementation manner, the new station scheduling indication information includes: the identifier of the new station to be scheduled; or, the identifiers of a group of schedulable new stations; or, the indication state information of an indication identifying site. When the new station scheduling indication information includes the indication state information of the indication identifying site, the indication state information is used for indicating the new station to send the data on the secondary channel not occupied by the legacy STA according to the CTS frame or not, under the condition that the legacy STA sends the data on the channel including the primary channel according to the CTS frame. For example, when the indication identifying site is 0, the new station sends no data on the secondary channel not occupied by the legacy STA according to the CTS frame, under the condition that the legacy STA sends the data on the channel including the primary channel according to the CTS frame; when the indication identifying site is 1, the new station sends the data on the secondary channel not occupied by the legacy STA according to the CTS frame, under the condition that the legacy STA sends the data on the channel including the primary channel according to the CTS frame, and at this time the new station may compete to send the data on the same channel.

In the above-mentioned embodiment, when the indication identifying site is 1, optionally, the indicating frame further includes a bandwidth occupied by the legacy STA and a reserved duration, and/or a bandwidth capable of being used by the new station and a transmission duration. At this time, before sending the data on the secondary channel not occupied by the legacy STA according to the indicating frame, the new station analyzes the indicating frame to obtain the bandwidth occupied by the legacy STA and the reserved duration, and/or the bandwidth capable of being used by the new station and the transmission duration, and then sends the data on the secondary channel not occupied by the legacy STA according to the obtained bandwidth occupied by the legacy STA and the reserved duration, and/or the bandwidth capable of being used by the new station and the transmission duration. Specifically, after receiving the CTS frame replied by the access point, the new station analyzes the CTS frame to obtain the bandwidth occupied by the legacy STA and the reserved duration, and/or the bandwidth capable of being used by the new station and the transmission duration. At this time, the new station may transmit data on the second channel not occupied by the legacy STA.

In the above-mentioned embodiment, after the new station sends the data on the secondary channel not occupied by the legacy STA according to the indicating frame, the method further includes:

receiving a second acknowledgement frame sent by the access point on the secondary channel not occupied by the legacy STA, wherein the indicating frame and/or the second acknowledgement frame are/is transmitted in an OFDMA manner.

In the above-mentioned embodiment, the new station sends the data on the secondary channel not occupied by the legacy STA according to the indicating frame in the OFDMA manner, and by sending the data in the OFDMA manner, the interference of data transmission to the legacy STA may be reduced.

In the above-mentioned embodiment, since multiple new stations may compete on the same channel, collision may occur, and some mechanisms may be adopted to reduce the collision probability. For example, before sending the data on the secondary channel, the new station needs to backspace, if other stations have sent the data on the secondary channel before the station backspaces to 0, the station could not send the data on the secondary channel, when the new station needs to evade before sending the data, OFDM symbol alignment needs to be kept with the data of the legacy STA when a data frame is sent, and the error thereof does not exceed the length of a cyclic prefix. As another example, the secondary channel is divided into multiple sub-channels, and each new station randomly selects one or multiple sub-channels to send data. As another example, the stations are grouped, and only the new station not in the same group as the legacy STA may send data. The above-mentioned mechanisms for reducing the collision may also be combined for use, and the embodiment of the present disclosure is not limited hereto.

In the above-mentioned embodiment, the new station needs to send the data in the OFDMA manner, in order to avoid the interference of the data transmission of the new station to the data of the legacy STA. Since the legacy STA does not support the OFDMA transmission manner, the interference to the new station is quite large, at this time, the data transmission of the new station may adopt a robust transmission manner, for example, a low-order modulation and coding scheme (Modulation and coding scheme, MCS) may be adopted to reduce the packet error rate.

According to the data transmission method provided by the embodiment, the new station receives the indicating frame sent by the access point, and may send the data on the secondary channel not occupied by the legacy STA according to the indicating frame, such that uplink OFDMA data transmission under a compatible mode is achieved, and the problem of bandwidth waste caused by data transmission of the legacy STA is solved.

Figure 6:
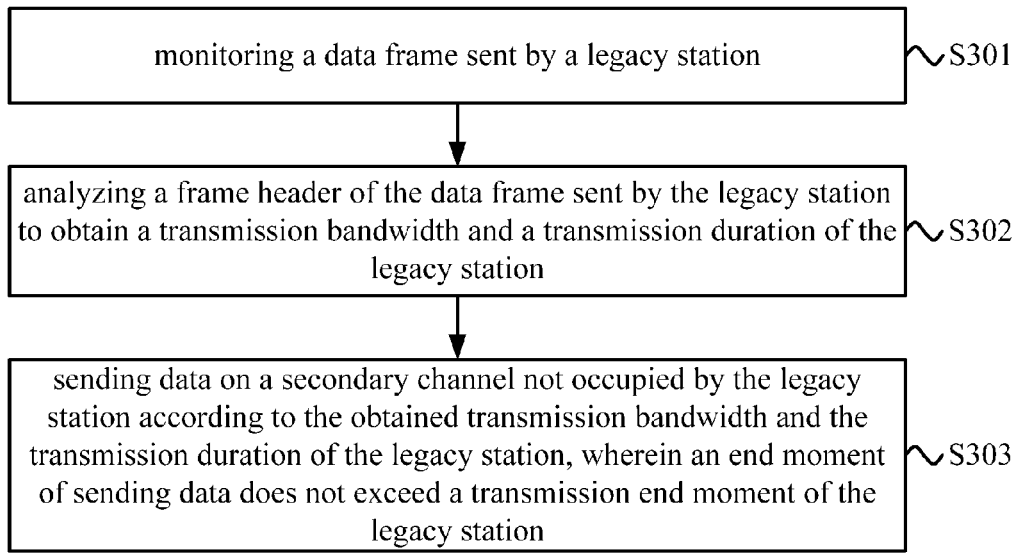
FIG. 6 is a flowchart of embodiment 3 of a data transmission method in the present disclosure.

FIG. 6 is a flowchart of embodiment 3 of a data transmission method in the present disclosure. The embodiment is illustrated by taking it as an example that a new station monitors data sent by a legacy STA and sends the data according to the obtained transmission bandwidth and transmission duration of the legacy STA, and as shown in FIG. 6, the method in the embodiment may include:

S301. a data frame sent by the legacy STA is monitored.

S302. the frame header of the data frame sent by the legacy STA is analyzed to obtain the transmission bandwidth and the transmission duration of the legacy STA.

The specific transmission bandwidth and the transmission duration are generally indicated in a bandwidth (Bandwidth, referred to as BW) field and a length (Length) field of the frame header of a physical layer respectively.

S303. data are sent on a secondary channel not occupied by the legacy STA according to the obtained transmission bandwidth and the transmission duration of the legacy STA, wherein the end moment of sending data may not exceed the transmission end moment of the legacy STA.

According to the data transmission method provided by the embodiment, the new station monitors the data frame sent by the legacy STA, analyzes the frame header of the data frame sent by the legacy STA to obtain the transmission bandwidth and the transmission duration of the legacy STA, and sends the data on the secondary channel not occupied by the legacy STA according to the obtained transmission bandwidth and the transmission duration of the legacy STA, such that uplink OFDMA data transmission under a compatible mode is achieved, and the problem of bandwidth waste caused by data transmission of the legacy STA is solved.

The technical solutions in the above-mentioned method embodiment will be illustrated below in detail in a specific embodiment.

Figure 7:
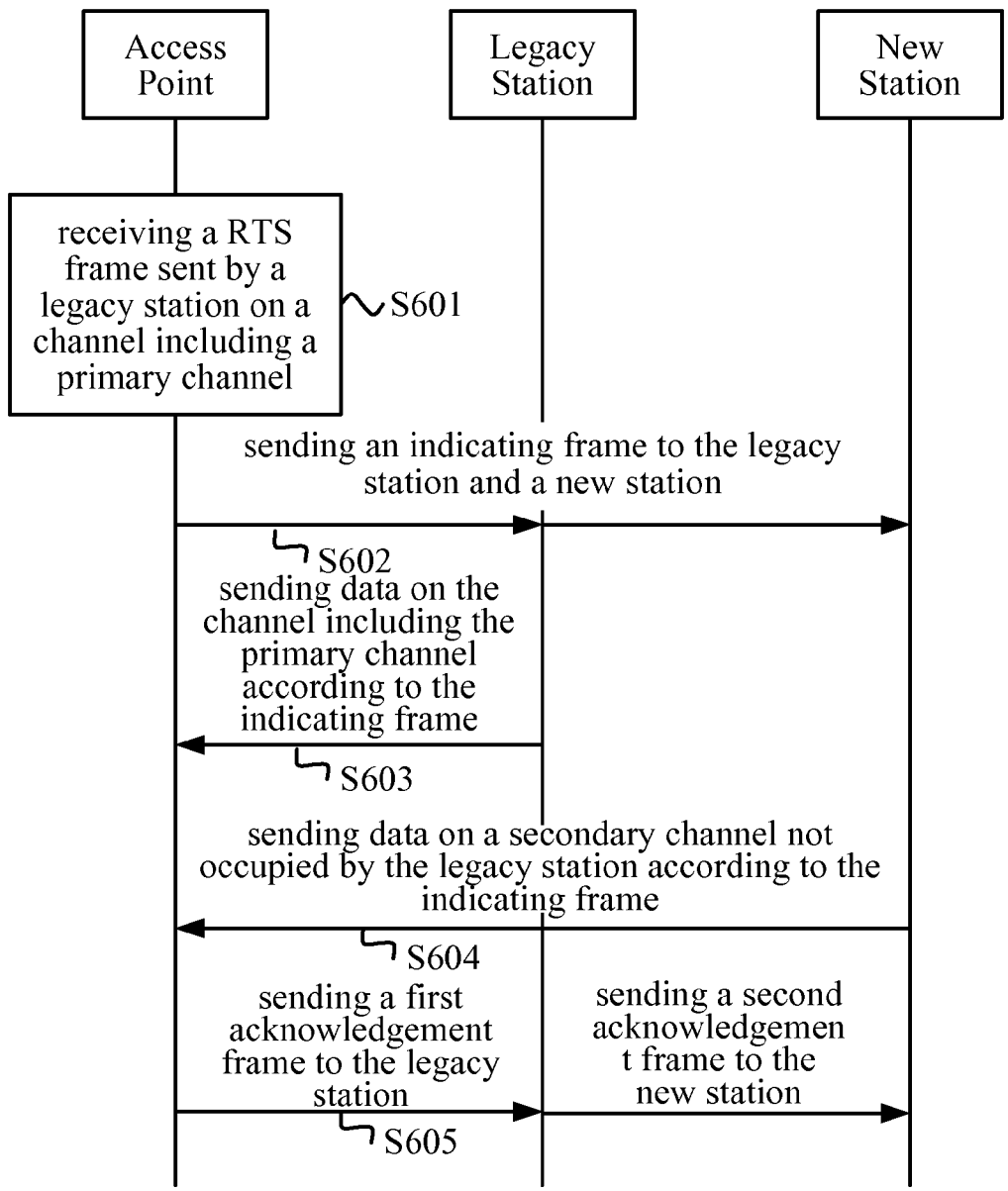
FIG. 7 is a flowchart of embodiment 4 of a data transmission method in the present disclosure.

FIG. 7 is a flowchart of embodiment 4 of a data transmission method in the present disclosure. The embodiment is illustrated by taking it as an example that an access point sends an indicating frame to a legacy STA and a new station after receiving an RTS frame, and the legacy STA and the new station send data according to the indicating frame, and as shown in FIG. 7, the method in the embodiment may include:

S601. the access point receives a request to send (RTS) frame sent by the legacy STA on a channel including a primary channel.

The access point receives the RTS frame sent by the legacy STA on the channel including the primary channel in a competition manner.

S602. the access point sends an indicating frame to the legacy STA and the new station.

After receiving the RTS frame, the access point sends the indicating frame to the legacy STA and the new station in two implementation manners:

one manner is that the access point sends a scheduling frame to the new station on a secondary channel not occupied by the legacy STA. The access point sends the scheduling frame to the new station on the secondary channel not occupied by the legacy STA in two possible implementation manners, one is that the access point sends the scheduling frame including the identifier of the new station to the new station on the secondary channel not occupied by the legacy STA, and this condition may be applied to the situation that, for example, the AP determines that some stations have data to be sent according to the feedback information or service rule of the station; the other is that the access point sends the scheduling frame including the identifiers of a group of schedulable new stations to the new stations, and this condition may be applied to the situation that, for example, the AP groups or broadcasts to all the stations in the case of having no exact sending information of the stations.

The other manner is that the access point sends a CTS frame including new station scheduling indication information to the legacy STA and the new station on the channel including the primary channel. The new station scheduling indication information includes: the identifier of the new station to be scheduled; or, the identifiers of a group of schedulable new stations; or, the indication state information of an indication identifying site.

When the new station scheduling indication information includes the indication state information of the indication identifying site, the indication state information is used for indicating the new station to send the data on the secondary channel not occupied by the legacy STA according to the CTS frame or not, under the condition that the legacy STA sends the data on the channel including the primary channel according to the CTS frame. For example, when the indication identifying site is 0, the new station sends no data on the secondary channel not occupied by the legacy STA according to the CTS frame, under the condition that the legacy STA sends the data on the channel including the primary channel according to the CTS frame; when the indication identifying site is 1, the new station sends the data on the secondary channel not occupied by the legacy STA according to the CTS frame, under the condition that the legacy STA sends the data on the channel including the primary channel according to the CTS frame, and at this time the new station may compete to send the data on the same channel. Under the above-mentioned condition, the indicating frame further includes a bandwidth occupied by the legacy STA and a reserved duration, and/or a bandwidth capable of being used by the new station and a transmission duration.

S603. the legacy STA sends data on the channel including the primary channel according to the indicating frame.

S604. the new station sends data on the secondary channel not occupied by the legacy STA according to the indicating frame.

Corresponding to S602, the new station sends the data on the secondary channel not occupied by the legacy STA according to the indicating frame in two implementation manners:

one manner is that the new station receives a scheduling frame sent by the access point on the secondary channel not occupied by the legacy STA, and sends the data on the secondary channel not occupied by the legacy STA according to the scheduling frame. There are two possible implementation manners under this condition, one is that the new station receives the scheduling frame including the identifier of the new station and sent by the access point on the secondary channel not occupied by the legacy STA, and determines to send the data on the secondary channel not occupied by the legacy STA after determining that the new station has being scheduled according to the identifier, and this condition may be applied to a situation that, for example, the AP determines that some stations have data to be sent according to the feedback information or service rule of the station; the other is that the new station receives the scheduling frame including the identifiers of a group of schedulable new stations sent by the access point, and sends the data on the secondary channel not occupied by the legacy STA according to a data sending demand, and this condition may be applied to the situation that, for example, the AP groups or broadcasts to all the stations in the case of having no exact sending information of the stations.

The other manner is that the new station receives a CTS frame including new station scheduling indication information sent by the access point on the channel including the primary channel, and sends data on the secondary channel not occupied by the legacy STA according to the CTS frame. Under this implementation manner, compared with the former implementation manner, the new station only needs to monitor the data sent by the primary channel, thereby being more conducive to saving power and quite simple to achieve.

Under this implementation manner, the new station scheduling indication information includes: the identifier of the new station to be scheduled; or, the identifiers of a group of schedulable new stations; or, the indication state information of an indication identifying site. When the new station scheduling indication information includes the indication state information of the indication identifying site, the indication state information is used for indicating the new station to send the data on the secondary channel not occupied by the legacy STA according to the CTS frame or not, under the condition that the legacy STA sends the data on the channel including the primary channel according to the CTS frame. For example, when the indication identifying site is 0, the new station sends no data on the secondary channel not occupied by the legacy STA according to the CTS frame, under the condition that the legacy STA sends the data on the channel including the primary channel according to the CTS frame; when the indication identifying site is 1, the new station sends the data on the secondary channel not occupied by the legacy STA according to the CTS frame, under the condition that the legacy STA sends the data on the channel including the primary channel according to the CTS frame, and at this time the new station may compete to send the data on the same channel.

When the indication identifying site is 1, optionally, the indicating frame further includes a bandwidth occupied by the legacy STA and a reserved duration, and/or a bandwidth capable of being used by the new station and a transmission duration. At this time, before sending the data on the secondary channel not occupied by the legacy STA according to the indicating frame, the new station analyzes the indicating frame to obtain the bandwidth occupied by the legacy STA and the reserved duration, and/or the bandwidth capable of being used by the new station and the transmission duration, and then sends the data on the secondary channel not occupied by the legacy STA according to the obtained bandwidth occupied by the legacy STA and the reserved duration, and/or the bandwidth capable of being used by the new station and the transmission duration. Specifically, after receiving the CTS frame replied by the access point, the new station analyzes the CTS frame to obtain the bandwidth occupied by the legacy STA and the reserved duration, and/or the bandwidth capable of being used by the new station and the transmission duration. At this time, the new station may transmit data on the second channel not occupied by the legacy STA.

S605. the access point sends a first acknowledgement frame to the legacy STA on the channel including the primary channel, and sends a second acknowledgement frame to the new station on the secondary channel not occupied by the legacy STA.

The first acknowledgement frame includes the information used for indicating whether the data of the legacy STA are correctly received or not, the second acknowledgement frame includes the information used for indicating whether the data of the new station are correctly received or not, the indicating frame and/or the acknowledgment frame are/is transmitted in an OFDMA manner, and the acknowledgment frame includes the information used for indicating whether the data of the new station are correctly received or not, and the form of the acknowledgment frame is determined by the data sending manner, including acknowledgment (Acknowledgement, referred to as ACK), block acknowledgment (Block Acknowledgement, referred to as BA), and the like. The acknowledgement frame may be transmitted in a downlink OFDMA manner, that is, the acknowledgement frame is sent to the legacy STA on the channel including the primary channel, and the acknowledgement frame is sent to the new station on the secondary channel not occupied by the legacy STA. Other multi-station acknowledgement manners may also be applicable to the present embodiment. For example, the acknowledgement frame is respectively sent to the legacy STA and the new station in a time division manner; when replying to the acknowledgement frame of the legacy STA, whether the data of the new station are correctly transmitted are indicated via a reserved bit in the acknowledgement frame of the legacy STA.

According to the data transmission method provided by the embodiment, the AP receives the request to send (RTS) frame sent by the legacy STA on the channel including the primary channel, and sends the indicating frame to the legacy STA and the new station, for enabling the legacy STA to send the data on the channel including the primary channel according to the indicating frame, and enabling the new station to send the data on the secondary channel not occupied by the legacy STA according to the indicating frame, such that uplink OFDMA data transmission under a compatible mode is achieved, and the problem of bandwidth waste caused by data transmission of the legacy STA is solved.

Those of ordinary skill in the art may understand that all or a part of the steps for achieving the above-mentioned method embodiments may be implemented with a program instructing corresponding hardware. The foregoing program may be stored in a computer readable storage medium. When being executed, the program may execute the steps of the above-mentioned method embodiments; the foregoing storage medium includes a variety of media capable of storing program codes, such as an ROM, an RAM, a magnetic disk, an optical disk and the like.

Figure 8:
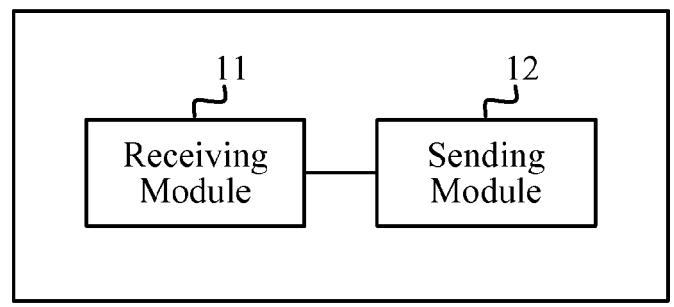
FIG. 8 is a schematic diagram of a structure of embodiment 1 of a data transmission apparatus in the present disclosure.

FIG. 8 is a schematic diagram of a structure of embodiment 1 of a data transmission apparatus in the present disclosure. As shown in FIG. 8, the apparatus in the embodiment may include a receiving module 11 and a sending module 12, wherein, the receiving module 11 is configured to receive a request to send (RTS) frame sent by a legacy STA on a channel including a primary channel.

The sending module 12 is configured to send an indicating frame to the legacy STA and a new station, for enabling the legacy STA to send data on the channel including the primary channel according to the indicating frame, and enabling the new station to send data on a secondary channel not occupied by the legacy STA according to the indicating frame.

According to the data transmission apparatus provided by the embodiment, the receiving module receives the RTS frame sent by the legacy STA on the channel including the primary channel, and the sending module sends the indicating frame to the legacy STA and the new station, for enabling the legacy STA to send the data on the channel including the primary channel according to the indicating frame, and enabling the new station to send the data on the secondary channel not occupied by the legacy STA according to the indicating frame, such that uplink OFDMA data transmission under a compatible mode is achieved, and the problem of bandwidth waste caused by data transmission of the legacy STA is solved.

The apparatus in the embodiment may be used for performing the technical solutions in the method embodiment as shown in FIG. 1, the achievement principle is similar, and will not be repeated redundantly herein.

Figure 9:
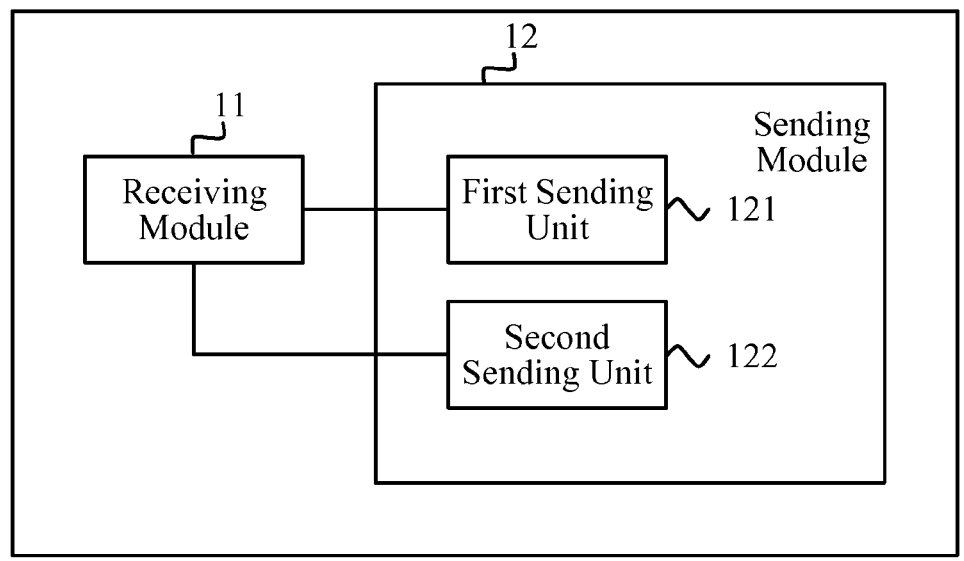
FIG. 9 is a schematic diagram of a structure of embodiment 2 of a data transmission apparatus in the present disclosure.

FIG. 9 is a schematic diagram of a structure of embodiment 2 of a data transmission apparatus in the present disclosure, as shown in FIG. 9, based on the structure of the apparatus as shown in FIG. 8, the sending module 12 of the apparatus in the embodiment further includes a first sending unit 121 and a second sending unit 122, wherein, the first sending unit 121 is configured to send a clear to send (CTS) frame to the legacy STA on the channel including the primary channel, for enabling the legacy STA to send the data on the channel including the primary channel according to the CTS frame.

The second sending unit 122 is configured to send a scheduling frame to the new station on the secondary channel not occupied by the legacy STA, for enabling the new station to send the data on the secondary channel not occupied by the legacy STA according to the scheduling frame.

The second sending unit 122 is specifically configured to send the scheduling frame including the identifier of the new station to the new station on the secondary channel not occupied by the legacy STA, for enabling the new station to send the data on the secondary channel not occupied by the legacy STA after determining that the new station has being scheduled according to the identifier; or send the scheduling frame including the identifiers of a group of schedulable new stations to the new stations, for enabling the group of new stations to send the data on the secondary channel not occupied by the legacy STA according to a data sending demand.

In the above-mentioned embodiment, the sending module 12 is specifically configured to send a CTS frame including new station scheduling indication information to the legacy STA and the new station on the channel including the primary channel, for enabling the legacy STA to send the data on the channel including the primary channel according to the CTS frame, and enabling the new station to send the data on the secondary channel not occupied by the legacy STA according to the CTS frame. The new station scheduling indication information includes: the identifier of the new station to be scheduled; or, the identifiers of a group of schedulable new stations; or, the indication state information of an indication identifying site.

Optionally, after the legacy STA and the new station send the data, the sending module 12 is further configured to send a first acknowledgement frame to the legacy STA on the channel including the primary channel, wherein the first acknowledgement frame includes the information used for indicating whether the data of the legacy STA are correctly received or not; send a second acknowledgement frame to the new station on the secondary channel not occupied by the legacy STA, wherein the second acknowledgement frame includes the information used for indicating whether the data of the new station are correctly received or not. The indicating frame and/or the acknowledgement frame are/is transmitted in an OFDMA manner.

In the above-mentioned embodiment, the indicating frame further includes a bandwidth occupied by the legacy STA and a reserved duration, and/or a bandwidth capable of being used by the new station and a transmission duration.

The apparatus in the embodiment may be used for performing the technical solutions in the method embodiment as shown in FIG. 1, the achievement principle is similar, and will not be repeated redundantly herein.

Figure 10:
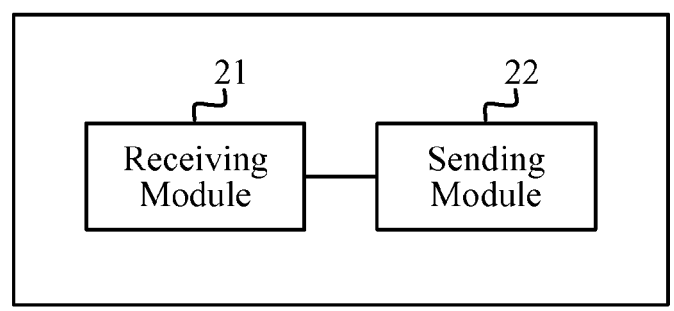
FIG. 10 is a schematic diagram of a structure of embodiment 3 of a data transmission apparatus in the present disclosure.

FIG. 10 is a schematic diagram of a structure of embodiment 3 of a data transmission apparatus in the present disclosure, as shown in FIG. 10, the apparatus in the embodiment may include: a receiving module 21 and a sending module 22, wherein, the receiving module 21 is configured to receive an indicating frame sent by an access point.

The sending module 22 is configured to send data on a secondary channel not occupied by a legacy STA according to the indicating frame.

Optionally, the receiving module 21 is specifically configured to receive a scheduling frame sent by the access point on the secondary channel not occupied by the legacy STA, and the sending module 22 is specifically configured to send the data on the secondary channel not occupied by the legacy STA according to the scheduling frame.

The receiving module 21 is specifically configured to receive the scheduling frame including the identifier of the new station and sent by the access point on the secondary channel not occupied by the legacy STA, and the sending module 22 is specifically configured to determine to send the data on the secondary channel not occupied by the legacy STA after determining that the new station has being scheduled according to the identifier; or, the receiving module 21 is specifically configured to receive the scheduling frame including the identifiers of a group of schedulable new stations sent by the access point, and the sending module 22 is specifically configured to send the data on the secondary channel not occupied by the legacy STA according to a data sending demand.

Optionally, the receiving module 21 is specifically configured to receive a CTS frame including new station scheduling indication information sent by the access point on the channel including the primary channel, and the sending module 22 is specifically configured to send the data on the secondary channel not occupied by the legacy STA according to the CTS frame. The new station scheduling indication information includes: the identifier of the new station to be scheduled; or, the identifiers of a group of schedulable new stations; or, the indication state information of an indication identifying site.

In the above-mentioned embodiment, the receiving module 21 is further configured to receive a second acknowledgement frame sent by the access point on the secondary channel not occupied by the legacy STA after sending the data on the secondary channel not occupied by the legacy STA according to the indicating frame, wherein the indicating frame and/or the second acknowledgement frame are/is transmitted in an OFDMA manner.

The sending module 22 is specifically configured to send the data on the secondary channel not occupied by the legacy STA according to the indicating frame in an OFDMA manner.

The apparatus in the embodiment may be used for performing the technical solutions in the method embodiment as shown in FIG. 2, the achievement principle is similar, and will not be repeated redundantly herein.

According to the data transmission apparatus provided by the embodiment, the receiving module receives the indicating frame sent by the access point, and the sending module sends the data on the secondary channel not occupied by the legacy STA according to the indicating frame, such that uplink OFDMA data transmission under a compatible mode is achieved, the new station may send the data on the secondary channel not occupied by the legacy STA, and the problem of bandwidth waste caused by data transmission of the legacy STA is solved.

Figure 11:
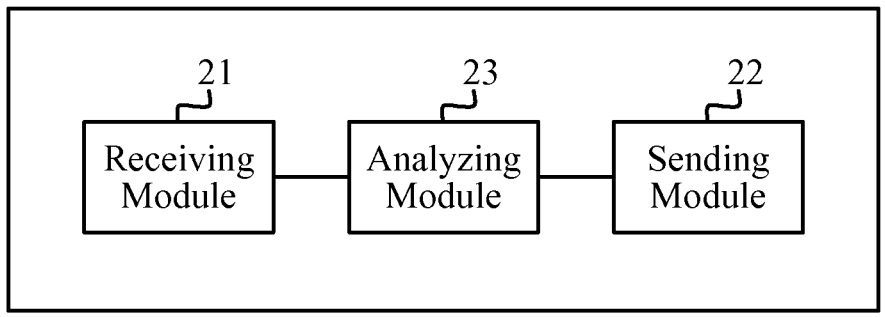
FIG. 11 is a schematic diagram of a structure of embodiment 4 of a data transmission apparatus in the present disclosure.

FIG. 11 is a schematic diagram of a structure of embodiment 4 of a data transmission apparatus in the present disclosure, as shown in FIG. 11, based on the structure of the apparatus in the present disclosure as shown in FIG. 10, when the indicating frame further includes a bandwidth occupied by the legacy STA and a reserved duration, and/or a bandwidth capable of being used by the new station and a transmission duration, the apparatus further includes: an analyzing module 23, the analyzing module 23 is configured to analyze the indicating frame to obtain the bandwidth occupied by the legacy STA and the reserved duration, and/or the bandwidth capable of being used by the new station and the transmission duration, before the sending module 22 sends the data on the secondary channel not occupied by the legacy STA according to the indicating frame.

The sending module 22 is specifically configured to send the data on the secondary channel not occupied by the legacy STA according to the obtained bandwidth occupied by the legacy STA and the reserved duration, and/or the bandwidth capable of being used by the new station and the transmission duration.

The apparatus in the embodiment may be used for performing the technical solutions in the method embodiment as shown in FIG. 2, the achievement principle is similar, and will not be repeated redundantly herein.

Figure 12:
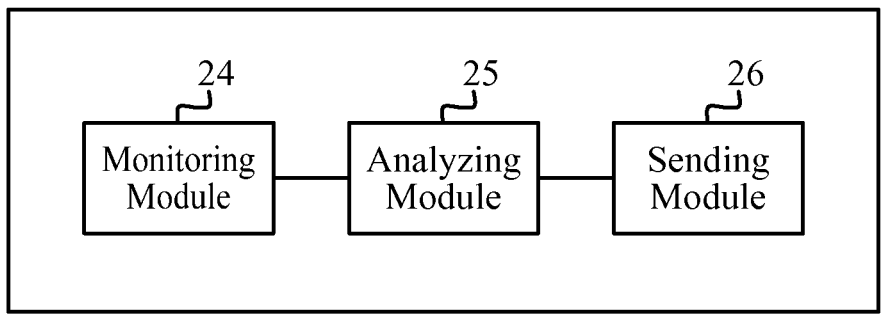
FIG. 12 is a schematic diagram of a structure of embodiment 5 of a data transmission apparatus in the present disclosure.

FIG. 12 is a schematic diagram of a structure of embodiment 5 of a data transmission apparatus in the present disclosure, as shown in FIG. 12, the apparatus in the embodiment includes a monitoring module 24, an analyzing module 25 and a sending module 26, wherein, the monitoring module 24 is configured to monitor a data frame sent by a legacy STA.

The analyzing module 25 is configured to analyze the frame header of the data frame sent by the legacy STA to obtain the transmission bandwidth and the transmission duration of the legacy STA.

The sending module 26 is configured to send data on a secondary channel not occupied by the legacy STA according to the obtained transmission bandwidth and the transmission duration of the legacy STA, wherein the end moment of sending data may not exceed the transmission end moment of the legacy STA.

The apparatus in the embodiment may be used for performing the technical solutions in the method embodiment as shown in FIG. 5, the achievement principle is similar, and will not be repeated redundantly herein.

A data transmission system in the embodiment of the present disclosure includes the data transmission apparatus as shown in any of FIG. 8 to FIG. 9 and FIG. 10 to FIG. 12, may be used for performing the technical solutions in the method embodiment as shown in FIG. 7, the achievement principle is similar, and will not be repeated redundantly herein.

Figure 13:
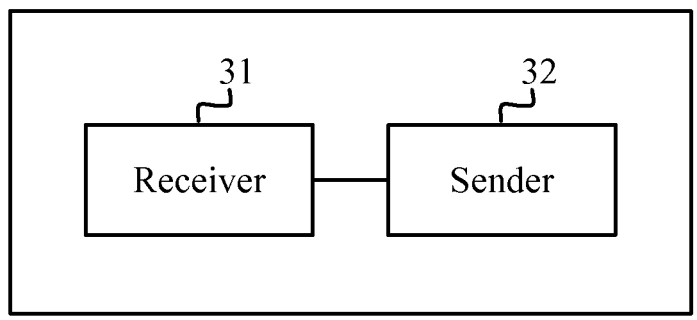
FIG. 13 is a schematic diagram of a structure of embodiment 6 of a data transmission apparatus in the present disclosure.

FIG. 13 is a schematic diagram of a structure of embodiment 6 of a data transmission apparatus in the present disclosure, as shown in FIG. 13, the apparatus in the embodiment may include a receiver 31 and a sender 32, wherein, the receiver 31 is configured to receive a request to send (RTS) frame sent by a legacy STA on a channel including a primary channel; and the sender 32 is configured to send an indicating frame to the legacy STA and a new station, for enabling the legacy STA to send data on the channel including the primary channel according to the indicating frame, and enabling the new station to send data on a secondary channel not occupied by the legacy STA according to the indicating frame.

According to the data transmission apparatus provided by the embodiment, the receiver receives the RTS frame sent by the legacy STA on the channel including the primary channel, and the sender sends the indicating frame to the legacy STA and the new station, for enabling the legacy STA to send the data on the channel including the primary channel according to the indicating frame, and enabling the new station to send the data on the secondary channel not occupied by the legacy STA according to the indicating frame, such that uplink OFDMA data transmission under a compatible mode is achieved, and the problem of bandwidth waste caused by data transmission of the legacy STA is solved.

Based on the structure of the apparatus as shown in FIG. 13, further, the sender 32 is further configured to send a CTS frame to the legacy STA on the channel including the primary channel, for enabling the legacy STA to send the data on the channel including the primary channel according to the CTS frame.

The sender 32 is specifically configured to send a scheduling frame to the new station on the secondary channel not occupied by the legacy STA, for enabling the new station to send the data on the secondary channel not occupied by the legacy STA according to the scheduling frame.

The sender 32 is specifically configured to send the scheduling frame including the identifier of the new station to the new station on the secondary channel not occupied by the legacy STA, for enabling the new station to send the data on the secondary channel not occupied by the legacy STA after determining that the new station has being scheduled according to the identifier; or send the scheduling frame including the identifiers of a group of schedulable new stations to the new stations, for enabling the group of new stations to send the data on the secondary channel not occupied by the legacy STA according to a data sending demand.

In the above-mentioned embodiment, the sender 32 is specifically configured to send a CTS frame including new station scheduling indication information to the legacy STA and the new station on the channel including the primary channel, for enabling the legacy STA to send the data on the channel including the primary channel according to the CTS frame, and enabling the new station to send the data on the secondary channel not occupied by the legacy STA according to the CTS frame. The new station scheduling indication information includes: the identifier of the new station to be scheduled; or, the identifiers of a group of schedulable new stations; or, the indication state information of an indication identifying site.

Optionally, after the legacy STA and the new station send the data, the sender 32 is further configured to send a first acknowledgement frame to the legacy STA on the channel including the primary channel, wherein the first acknowledgement frame includes the information used for indicating whether the data of the legacy STA are correctly received or not; send a second acknowledgement frame to the new station on the secondary channel not occupied by the legacy STA, wherein the second acknowledgement frame includes the information used for indicating whether the data of the new station are correctly received or not. The indicating frame and/or the acknowledgement frame is transmitted in an OFDMA manner.

In the above-mentioned embodiment, the indicating frame further includes a bandwidth occupied by the legacy STA and a reserved duration, and/or a bandwidth capable of being used by the new station and a transmission duration.

The apparatus in the embodiment may be used for performing the technical solutions in the method embodiment as shown in FIG. 1, the achievement principle is similar, and will not be repeated redundantly herein.

Figure 14:
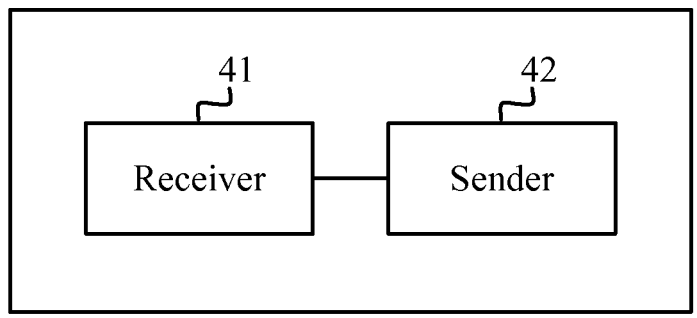
FIG. 14 is a schematic diagram of a structure of embodiment 7 of a data transmission apparatus in the present disclosure.

FIG. 14 is a schematic diagram of a structure of embodiment 7 of a data transmission apparatus in the present disclosure, as shown in FIG. 14, the apparatus in the embodiment may include: a receiver 41 and a sender 42, wherein, the receiver 41 is configured to receive an indicating frame sent by an access point.

The sender 42 is configured to send data on a secondary channel not occupied by a legacy STA according to the indicating frame.

Optionally, the receiver 41 is specifically configured to receive a scheduling frame sent by the access point on the secondary channel not occupied by the legacy STA, and the sender 42 is specifically configured to send the data on the secondary channel not occupied by the legacy STA according to the scheduling frame.

The receiver 41 is specifically configured to receive the scheduling frame including the identifier of the new station and sent by the access point on the secondary channel not occupied by the legacy STA, and the sender 42 is specifically configured to determine to send the data on the secondary channel not occupied by the legacy STA after determining that the new station has being scheduled according to the identifier; or, the receiver 41 is specifically configured to receive the scheduling frame including the identifiers of a group of schedulable new stations sent by the access point, and the sender 42 is specifically configured to send the data on the secondary channel not occupied by the legacy STA according to a data sending demand.

Optionally, the receiver 41 is specifically configured to receive a CTS frame including new station scheduling indication information sent by the access point on the channel including the primary channel, and the sender 42 is specifically configured to send the data on the secondary channel not occupied by the legacy STA according to the CTS frame. The new station scheduling indication information includes: the identifier of the new station to be scheduled; or, the identifiers of a group of schedulable new stations; or, the indication state information of an indication identifying site.

In the above-mentioned embodiment, the receiver 41 is further configured to receive a second acknowledgement frame sent by the access point on the secondary channel not occupied by the legacy STA after sending the data on the secondary channel not occupied by the legacy STA according to the indicating frame, wherein the indicating frame and/or the second acknowledgement frame are/is transmitted in an OFDMA manner.

The sender 42 is specifically configured to send the data on the secondary channel not occupied by the legacy STA according to the indicating frame in an OFDMA manner.

The apparatus in the embodiment may be used for performing the technical solutions in the method embodiment as shown in FIG. 2, the achievement principle is similar, and will not be repeated redundantly herein.

According to the data transmission apparatus provided by the embodiment, the receiver receives the indicating frame sent by the access point, and the sender sends the data on the secondary channel not occupied by the legacy STA according to the indicating frame, such that uplink OFDMA data transmission under a compatible mode is achieved, the new station may send the data on the secondary channel not occupied by the legacy STA, and the problem of bandwidth waste caused by data transmission of the legacy STA is solved.

Figure 15:
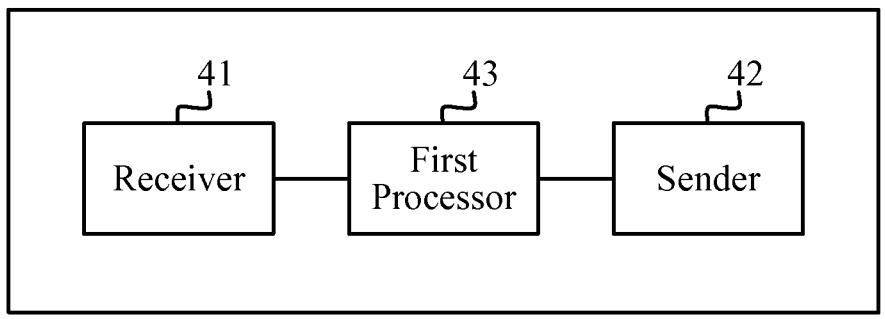
FIG. 15 is a schematic diagram of a structure of embodiment 8 of a data transmission apparatus in the present disclosure.

FIG. 15 is a schematic diagram of a structure of embodiment 8 of a data transmission apparatus in the present disclosure, as shown in FIG. 15, based on the structure of the apparatus as shown in FIG. 14, when the indicating frame further includes a bandwidth occupied by the legacy STA and a reserved duration, the apparatus in the embodiment further includes: a first processor 43, the first processor 43 is configured to analyze the indicating frame to obtain the bandwidth occupied by the legacy STA and the reserved duration, before the sender 42 sends the data on the secondary channel not occupied by the legacy STA according to the indicating frame.

The sender 42 is specifically configured to send the data on the secondary channel not occupied by the legacy STA according to the obtained bandwidth occupied by the legacy STA and the reserved duration.

The apparatus in the embodiment may be used for performing the technical solutions in the method embodiment as shown in FIG. 2, the achievement principle is similar, and will not be repeated redundantly herein.

Figure 16:
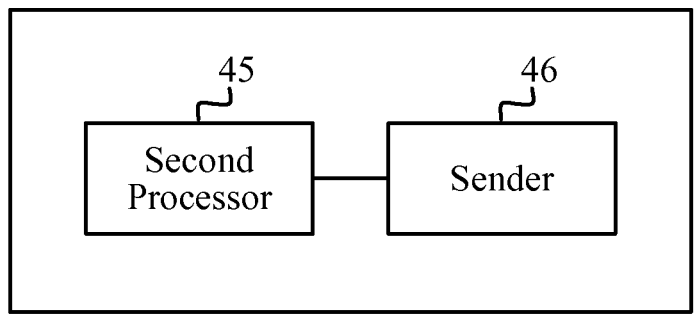
FIG. 16 is a schematic diagram of a structure of embodiment 9 of a data transmission apparatus in the present disclosure.

FIG. 16 is a schematic diagram of a structure of embodiment 9 of a data transmission apparatus in the present disclosure, as shown in FIG. 16, the apparatus in the embodiment includes a second processor 45 and a sender 46, wherein, the second processor 45 is configured to monitor a data frame sent by a legacy STA.

The second processor 45 is further configured to analyze the frame header of the data frame sent by the legacy STA to obtain the transmission bandwidth and the transmission duration of the legacy STA.

The sender 46 is configured to send data on a secondary channel not occupied by the legacy STA according to the obtained transmission bandwidth and the transmission duration of the legacy STA, wherein the end moment of sending data may not exceed the transmission end moment of the legacy STA.

The apparatus in the embodiment may be used for performing the technical solutions in the method embodiment as shown in FIG. 5, the achievement principle is similar, and will not be repeated redundantly herein.

A data transmission system in the embodiment of the present disclosure includes the data transmission apparatus as shown in any of FIG. 13 and FIG. 14 to FIG. 16, may be used for performing the technical solutions in the method embodiment as shown in FIG. 6, the achievement principle is similar, and will not be repeated redundantly herein.

Finally, it should be noted that the above-mentioned embodiments are merely used for illustrating the technical solutions of the present disclosure, rather than limiting them; although the present disclosure has been described in detail with reference to the foregoing embodiments, those of ordinary skill in the art should understand that they could still make modifications to the technical solutions recorded in the foregoing embodiments or make equivalent substitutions to a part of or all the technical features; and these modifications or substitutions do not make the essence of the corresponding technical solutions depart from the scope of the technical solutions of the embodiments of the present disclosure.

What is claimed is:

1. A data transmission method, comprising:
receiving a request to send (RTS) frame sent by a legacy station on a channel including a primary channel; and
sending a clear to send (CTS) an frame including new station scheduling indication information to the legacy station and a new station on the channel including the primary channel for enabling the legacy station to send data on the channel including the primary channel according to the CTS frame, and enabling the new station to send data on a secondary channel not occupied by the legacy station according to the CTS frame;
receiving the data on the secondary channel not occupied by the legacy station sent by the new station according to the CTS frame, wherein the new station scheduling indication information includes indication state information of an indication identifying site, the indication state information is used for indicating the new station to send or not send the data on the secondary channel not occupied by the legacy station according to the CTS frame, under the condition that the legacy station sends the data on the channel including the primary channel according to the CTS frame, and the access point schedules the new station by using a reserved bit or a reusable bit in the CTS frame.

2. The method of claim 1, wherein after the legacy station and the new station send data, the method further comprises:

sending a first acknowledgement frame to the legacy station on the channel including the primary channel, wherein the first acknowledgement frame includes information used for indicating whether the data of the legacy station are correctly received or not; and sending a second acknowledgement frame to the new station on the secondary channel not occupied by the legacy station, wherein the second acknowledgement frame includes information used for indicating whether the data of the new station are correctly received or not.

3. A data transmission method, comprising:

receiving a clear to send (CTS) frame including new station scheduling indication information sent by an access point on the channel including the primary channel for enabling the new station to send data on a secondary channel not occupied by the legacy station according to the CTS frame; and sending data on a secondary channel not occupied by a legacy station according to the CTS frame, wherein the new station scheduling indication information includes indication state information of an indication identifying site, the indication state information is used for indicating the new station to send or not send the data on the secondary channel not occupied by the legacy station according to the CTS frame, under the condition that the legacy station sends the data on the channel including the primary channel according to the CTS frame, and the access point schedules the new station by using a reserved bit or a reusable bit in the CTS frame.

4. A data transmission apparatus, comprising:

a receiver and a sender, comprising at least one processor;

the receiver, configured to receive a request to send (RTS) frame sent by a legacy station on a channel including a primary channel; and the sender, configured to send a clear to send (CTS) including new station scheduling indication information to the legacy station and a new station on the channel including the primary channel, for enabling the legacy station to send data on the channel including the primary channel according to the CTS frame, and enabling the new station to send data on a secondary channel not occupied by the legacy station according to the CTS frame, wherein the receiver further receives the data on the secondary channel not occupied by the legacy station sent by the new station according to the CTS frame, wherein the new station scheduling indication information includes indication state information of an indication identifying site, the indication state information is used for indicating the new station to send or not send the data on the secondary channel not occupied by the legacy station according to the CTS frame, under the condition that the legacy station sends the data on the channel including the primary channel according to the CTS frame, and the data transmission apparatus schedules the new station by using a reserved bit or a reusable bit in the CTS frame.

5. The apparatus of claim 4, wherein the sender is further configured to:

send a first acknowledgement frame to the legacy station on the channel including the primary channel, after the legacy station and the new station send the data, wherein the first acknowledgement frame comprises the information used for indicating whether the data of the legacy station are correctly received or not;

send a second acknowledgement frame to the new station on the secondary channel not occupied by the legacy station, wherein the second acknowledgement frame includes information used for indicating whether the data of the new station are correctly received or not.

6. A data transmission apparatus, comprising:

a receiver and a sender comprising at least one processor;

the receiver configured to receive a clear to send (CTS), frame including new station scheduling indication information sent by an access point on the channel including the primary channel, for enabling the data transmission apparatus to send data on a secondary channel not occupied by the legacy station according to the CTS frame; and the sender, configured to send data on a secondary channel not occupied by a legacy station according to the CTS frame, wherein the new station scheduling indication information includes indication state information of an indication identifying site, the indication state information is used for indicating the data transmission apparatus to send or not send the data on the secondary channel not occupied by the legacy station according to the CTS frame, under the condition that the legacy station sends the data on the channel including the primary channel according to the CTS frame, and the access point schedules the data transmission apparatus by using a reserved bit or a reusable bit in the CTS frame.

\* \* \* \* \*